US011750630B2

(12) United States Patent
Albero et al.

(10) Patent No.: US 11,750,630 B2
(45) Date of Patent: *Sep. 5, 2023

(54) REAL-TIME VALIDATION OF APPLICATION DATA

(71) Applicant: Bank of America Corporation, Charlotte, NC (US)

(72) Inventors: George Albero, Charlotte, NC (US); Gulsen Saffel, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,663

(22) Filed: Oct. 19, 2021

(65) Prior Publication Data

US 2022/0038485 A1 Feb. 3, 2022

Related U.S. Application Data

(63) Continuation of application No. 16/736,969, filed on Jan. 8, 2020, now Pat. No. 11,184,381.

(51) Int. Cl.
*H04L 9/40* (2022.01)
(52) U.S. Cl.
CPC ...... *H04L 63/1425* (2013.01); *H04L 63/1433* (2013.01)
(58) Field of Classification Search
CPC . H04L 63/1425; H04L 63/1433; H04L 63/08; H04W 12/121
See application file for complete search history.

(56) References Cited

U.S. PATENT DOCUMENTS 7,685,271 B1 3/2010 Schneider et al.
8,407,798 B1 3/2013 Lotem et al.
(Continued)

FOREIGN PATENT DOCUMENTS

JP 2015015581 A * 1/2015 ......... H04L 63/1416
KR 102500033 B1 * 2/2023 ............... H04L 9/40
WO WO-2022198580 A1 * 9/2022 ......... H04L 63/1416

OTHER PUBLICATIONS

Matsumoto et al., A Method of Preventing Unauthorized Data Transmission in Contoller Area Network, 2012; IEEE 75th Vehicular Technology Conference (VTC Spring) Year: 2012; Conference Paper; Publisher IEEE.
(Continued)

*Primary Examiner* — Sarah Su
(74) *Attorney, Agent, or Firm* — Banner & Witcoff, Ltd.

(57) ABSTRACT

Aspects of the disclosure relate to real-time validation of application data. A computing platform may collect, in real-time, information associated with a plurality of data transmissions between applications, where the information includes, for each data transmission of the plurality of data transmissions, an indication of a source application and a destination application, a first indication whether the data transmission was sent by the source application, and a second indication whether the data transmission was received by the destination application. The computing platform may compare, for each data transmission, the first indication and the second indication. The computing platform may detect, for a particular data transmission, a lack of a match between the first indication and the second indication. The computing platform may identify the particular data transmission as an anomalous data transmission. Then, the computing platform may trigger one or more security actions to mitigate the anomalous data transmission.

20 Claims, 5 Drawing Sheets

(56) References Cited

U.S. PATENT DOCUMENTS

| | | | |
|---|---|---|---|
| 9,412,073 B2 | 8/2016 | Brandt et al. | |
| 9,578,060 B1 | 2/2017 | Brisebois et al. | |
| 9,692,731 B2 | 6/2017 | Acharya et al. | |
| 9,696,346 B2 | 7/2017 | Pietrowicz et al. | |
| 9,866,532 B2 | 1/2018 | Acharya et al. | |
| 9,871,811 B2 | 1/2018 | Lambert et al. | |
| 9,930,065 B2 | 3/2018 | Nelms et al. | |
| 10,187,413 B2 | 1/2019 | Vasseur et al. | |
| 10,454,950 B1* | 10/2019 | Aziz | H04L 63/1425 |
| 10,708,294 B2* | 7/2020 | Northway, Jr. | H04L 63/0227 |
| 11,184,381 B2* | 11/2021 | Albero | H04L 63/1441 |
| 11,297,085 B2* | 4/2022 | Albero | H04L 63/1433 |
| 2010/0284288 A1 | 11/2010 | Lee et al. | |
| 2012/0110345 A1 | 5/2012 | Pigeon et al. | |
| 2012/0303476 A1 | 11/2012 | Krzyzanowski et al. | |
| 2012/0331544 A1 | 12/2012 | Bostrom et al. | |
| 2013/0198845 A1 | 8/2013 | Anvari | |
| 2013/0298201 A1 | 11/2013 | Aravindakshan et al. | |
| 2014/0013396 A1 | 1/2014 | Field-Eliot et al. | |
| 2015/0271201 A1 | 9/2015 | Ruvio et al. | |
| 2016/0072709 A1 | 3/2016 | Moore | |
| 2016/0088022 A1 | 3/2016 | Handa et al. | |
| 2016/0182559 A1 | 6/2016 | Francy et al. | |
| 2016/0330222 A1 | 11/2016 | Brandt et al. | |
| 2017/0099208 A1 | 4/2017 | Wang et al. | |
| 2017/0149811 A1 | 5/2017 | Corrales et al. | |
| 2017/0208077 A1 | 7/2017 | Freedman et al. | |
| 2017/0244749 A1 | 8/2017 | Shulman et al. | |
| 2018/0004152 A1 | 1/2018 | Nishino | |
| 2018/0012486 A1 | 1/2018 | Israelsson | |
| 2018/0020015 A1* | 1/2018 | Munro | G06F 21/552 |
| 2018/0048663 A1 | 2/2018 | Yura et al. | |
| 2018/0152523 A1 | 5/2018 | Lohse et al. | |
| 2018/0159884 A1 | 6/2018 | Meier | |
| 2018/0191782 A1 | 7/2018 | Djordjevic et al. | |
| 2018/0197105 A1 | 7/2018 | Luo et al. | |
| 2018/0212985 A1 | 7/2018 | Zadeh et al. | |
| 2018/0288063 A1 | 10/2018 | Koottayi et al. | |
| 2018/0359259 A1 | 12/2018 | Leon | |
| 2019/0068614 A1 | 2/2019 | Bhatnagar et al. | |
| 2019/0098019 A1 | 3/2019 | Coleman et al. | |
| 2019/0104108 A1 | 4/2019 | Rhee et al. | |
| 2020/0134083 A1 | 4/2020 | Elliman | |
| 2020/0296126 A1 | 9/2020 | Compagna et al. | |
| 2020/0380160 A1 | 12/2020 | Kraus et al. | |
| 2021/0092132 A1 | 3/2021 | Bhatia et al. | |
| 2021/0092138 A1* | 3/2021 | Clark | H04L 63/1425 |
| 2021/0092153 A1 | 3/2021 | Wei et al. | |
| 2021/0112091 A1 | 4/2021 | Compton | |
| 2021/0211445 A1 | 7/2021 | Albero et al. | |
| 2021/0211446 A1* | 7/2021 | Albero | H04W 12/121 |
| 2021/0250365 A1 | 8/2021 | Atkinson et al. | |

OTHER PUBLICATIONS

Setyawan, et al. Web Services Security and Threats: A Systematic Literature Review; 2020; International Conference on ICT for Smart Society (ICISS) Year 2020; vol. CFP2013V-ART; Conference Paper; Publisher IEEE.

F. Shaman, B. Ghita, N. Clarke and A. Alruban, "User Profiling Based on Application-Level Using Network Metadata," 2019 7th International Symposium on Digital Forensics and Security (ISDFS), 2019, pp. 1-8, doi: 10.1109/ISDFS.2019.8757503. (Year: 2019).

* cited by examiner

REAL-TIME VALIDATION OF APPLICATION DATA

This application claims the benefit of and is a continuation of U.S. patent application Ser. No. 16/736,969, filed Jan. 8, 2020, and entitled "Real-Time Validation of Application Data," This application is incorporated by reference herein in its entirety.

BACKGROUND

Aspects of the disclosure relate to deploying digital data processing systems to protect enterprise resources. In particular, one or more aspects of the disclosure relate to real-time validation of application data.

Enterprise organizations may utilize various resources to support their computing infrastructure. For large enterprise organizations, maintaining, updating, and managing network activity over the various enterprise resources may be of significant importance in protecting confidential information and/or other sensitive data that is created, transmitted, and/or used for various purposes. It may be helpful to analyze data flow between applications to identify anomalies in data transmission, such as, for example, if data is received by an intended recipient, and/or if data is being misdirected to a different recipient, and/or if data is lost in transmission. As data flows through the network in real-time, such detection and management of network activity may be time-sensitive and there may be significant advantages for the detection and management to be performed in real-time as well. Ensuring that discrepancies in data flow are detected, and timely and targeted remediation measures are performed, in real time with speed and accuracy, may be particularly advantageous to ensure a smooth running of an enterprise infrastructure. In many instances, however, it may be difficult to analyze data flow, in an organization's complex network comprising a vast number of network devices and users, while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with real-time validation of application data.

In accordance with one or more embodiments, a computing platform having at least one processor, a communication interface, and memory may collect, in real-time and via a computing device and via a wireless network, information associated with a plurality of data transmissions between applications, where the information includes, for each data transmission of the plurality of data transmissions, an indication of a source application and a destination application, for each data transmission of the plurality of data transmissions, a first indication whether the data transmission was sent by the source application, and for each data transmission of the plurality of data transmissions, a second indication whether the data transmission was received by the destination application. Then, the computing platform may compare, via the computing device and in real-time and for each data transmission of the plurality of data transmissions, the first indication and the second indication. The computing platform may then detect, via the computing device and based on the comparing and for a particular data transmission, a lack of a match between the first indication and the second indication. Subsequently, the computing platform may identify, based on the detecting, the particular data transmission as an anomalous data transmission. Then, the computing platform may trigger, via the computing device, one or more security actions to mitigate the anomalous data transmission.

In some embodiments, the computing platform may display, via a graphical user interface, the information in a tabular format, where the tabular format lists, for each application, a first sub-plurality of the plurality of data transmissions for which the application is a source application, and a second sub-plurality of the plurality of data transmissions for which the application is a destination application. In some embodiments, the computing platform may update, dynamically and in real-time and via the computing device, the display. In some embodiments, the computing platform may highlight the information associated with the anomalous data transmission. In some embodiments, the computing platform may update, dynamically and in real-time and via the computing device, the information the tabular format, wherein the update comprises generating, for each data transmission of the plurality of data transmissions, a new row.

In some embodiments, the source application and the destination application may be associated with an enterprise organization.

In some embodiments, the first application may be associated with an enterprise organization, and the second application may be associated with an external vendor organization.

In some embodiments, the one or more security actions may include preventing related data transmission.

In some embodiments, the one or more security actions may include modifying, via the computing device, an access permission of an enterprise user associated with the anomalous data transmission.

In some embodiments, the one or more security actions may include generating, based on the detecting, a risk profile of an enterprise user associated with the anomalous data transmission, wherein the risk profile is indicative of a likelihood of the enterprise user to transmit secure enterprise information.

In some embodiments, the one or more security actions may include generating, based on the detecting, a risk profile of an application associated with the anomalous data transmission, wherein the risk profile is indicative of a likelihood of the application to transmit secure enterprise information.

In some embodiments, the one or more security actions may include generating a notification for an application manager to review the anomalous data transmission.

In some embodiments, the one or more security actions may include reviewing, via the computing device, a content of the anomalous data transmission.

Implementations of the described techniques may include hardware, a method or process, or computer software on a computer-accessible medium.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
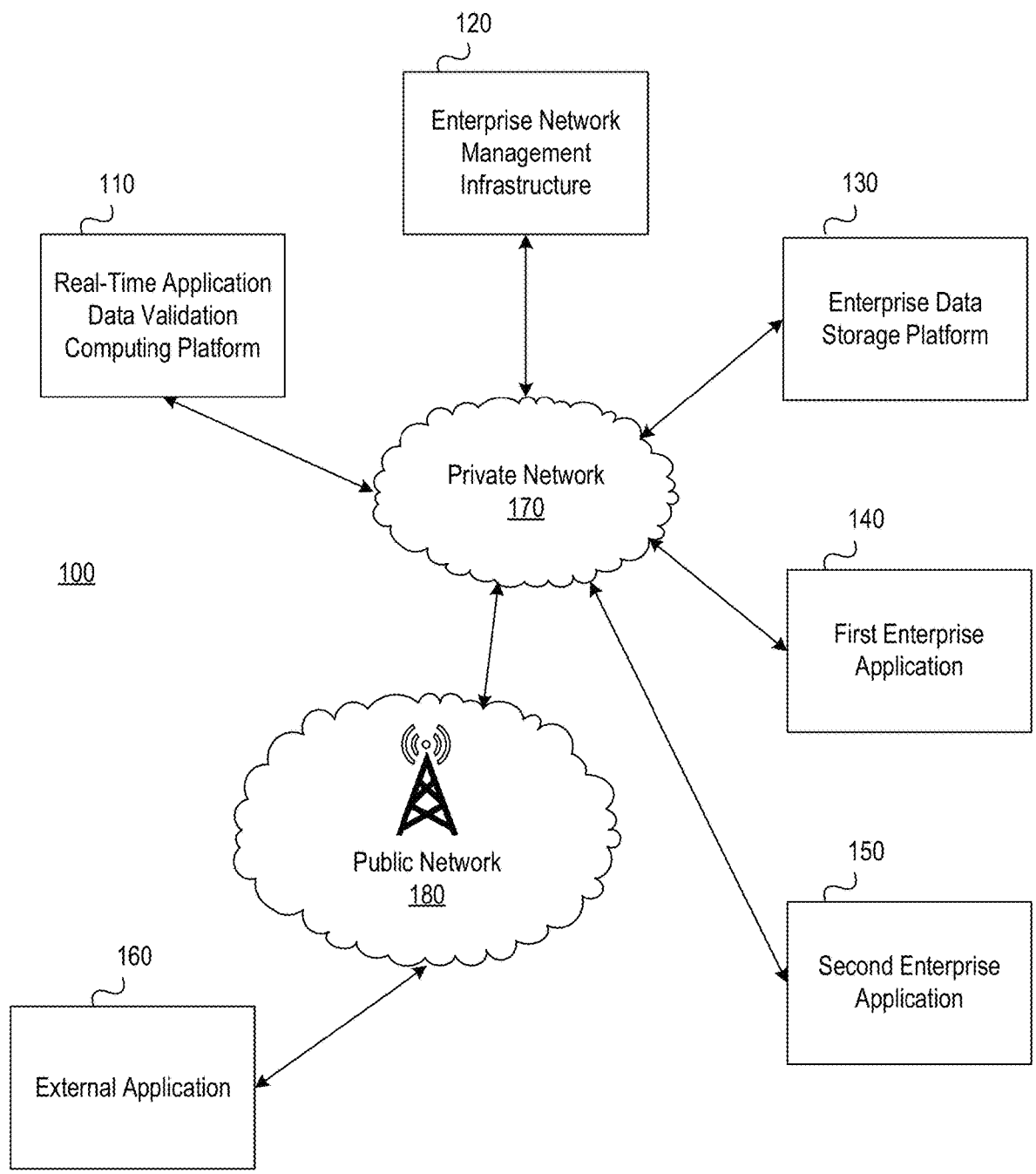
FIGS. 1A and 1B depict an illustrative computing environment for a real-time validation of application data in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Some aspects of the disclosure relate to a real-time validation of application data, and triggering steps to mitigate the effects of such activity in a pro-active and timely manner. For example, an enterprise network management infrastructure may deploy computing resources such as network devices, web resources, electronic mail applications, external vendor applications, and so forth. A large amount of data (including machine-generated data) may be exchanged between such applications. In some instances, such data transmissions, unless adequately monitored, may pose a large security threat to the enterprise services. For large enterprise organizations with vast amounts of deployed resources and a large number of employees, data transmissions may take varied and complex forms, and may require real-time monitoring.

For example, it may be of significance to have accurate and complete information on what data is being transmitted between systems and applications. For example, confidential data may be exchanged between secured applications and it may be pertinent to know if the data transmission was completed, and/or if it reached the intended recipient. Such information may be pertinent to prevent data leak, since a first application may be sending data to an intended recipient, and if the intended recipient does not receive the data, then there may be a data leak, and/or the data may have been incorrectly routed.

Generally, it may not be possible to manually manage such a vast array of network users and devices, with near-continuous flow of data. Accordingly, it may be of great significance for a large enterprise organization (e.g., financial institution), with large amounts of confidential information to protect, to detect, in real-time, anomalous data transmissions, and to trigger appropriate security measures.

Accordingly, aspects of this disclosure relate to automated monitoring of source and destination information for data transmissions to identify anomalous data transmissions in real-time, and initiate actions to mitigate such activities. Identifying such anomalous data transmissions via a manual process and/or based on mental steps is unlikely because it relates to vast amounts of real-time network data traffic, and such network data traffic is rapidly changing in real-time over thousands of enterprise resources. Also, since the network data may reside and/or be exchanged over a vast array of users, internal and external applications, and network devices, it necessitates a use of computing devices to access the information associated with the plurality of data transmissions over networks, detect patterns and/or anomalous behaviors in real-time as the data is sent, received, and/or dropped, and initiate relevant action in real-time and over the network. It may be noted, that as data transmissions occur over a computing network, the problem of detecting potentially harmful activities across an enterprise infrastructure arises in the realm of networks, and as described herein, a solution is necessarily rooted in computer technology to overcome a problem arising in the realm of computer networks.

Figure 1B:
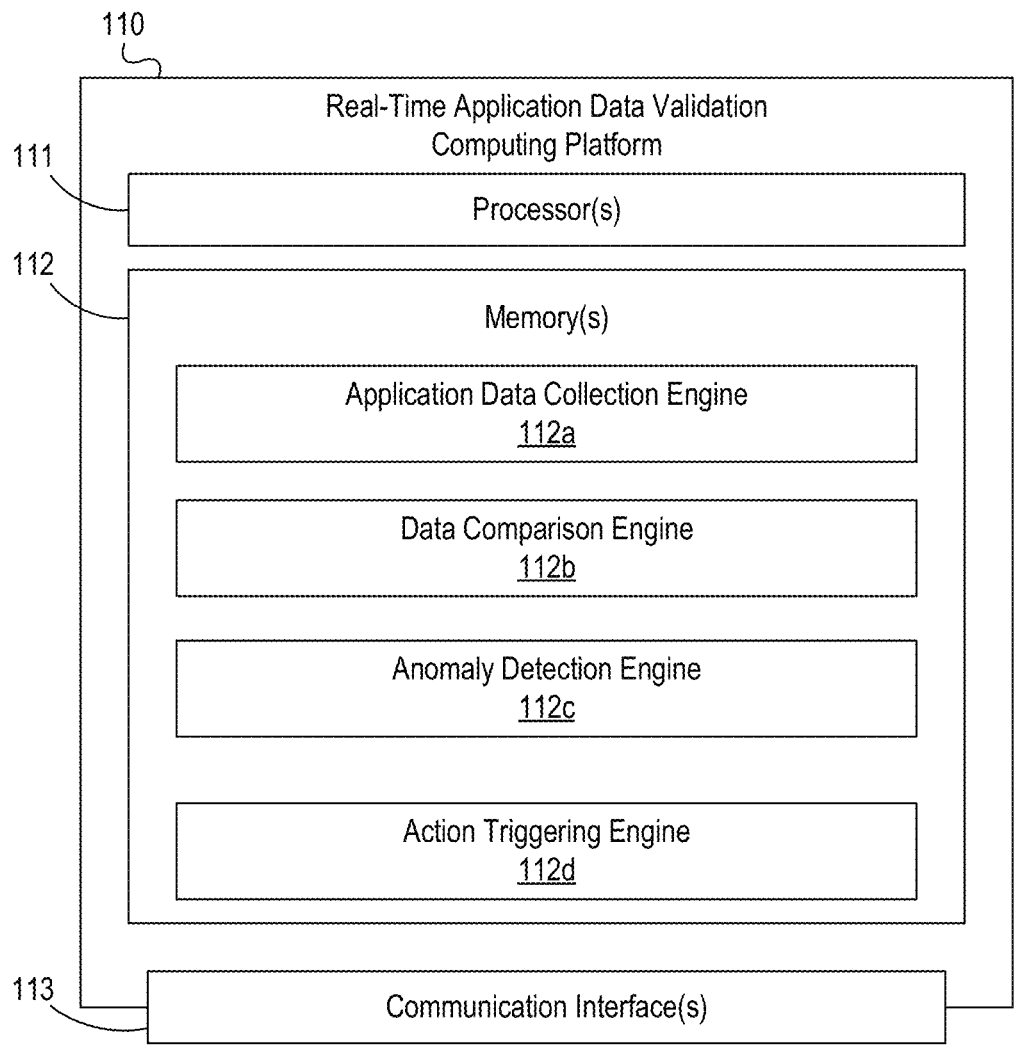

FIGS. 1A and 1B depict an illustrative computing environment for a real-time validation of application data in accordance with one or more example embodiments. Referring to FIG. 1A, computing environment 100 may include one or more computer systems. For example, computing environment 100 may include real-time application data validation computing platform 110, enterprise network management infrastructure 120, enterprise data storage platform 130, first enterprise application 140, second enterprise application 150, and external application 160.

As illustrated in greater detail below, real-time application data validation computing platform 110 may include one or more computing devices configured to perform one or more of the functions described herein. For example, real-time application data validation computing platform 110 may include one or more computers (e.g., laptop computers, desktop computers, servers, server blades, or the like) and/or other computer components (e.g., processors, memories, communication interfaces).

Enterprise network management infrastructure 120 may include one or more computing devices and/or other computer components (e.g., processors, memories, communication interfaces). In addition, enterprise network management infrastructure 120 may be configured to manage, host, execute, and/or otherwise provide one or more enterprise applications (e.g., first enterprise application 140, second enterprise application 150). For example, enterprise network management infrastructure 120 may be configured to manage, host, execute, and/or otherwise provide a computing platform for various network devices and enterprise applications. In some instances, enterprise network management infrastructure 120 may be configured to provide various enterprise and/or back-office computing functions for an enterprise organization, such as a financial institution. For example, enterprise network management infrastructure 120 may include various servers and/or databases that store and/or otherwise maintain account information, such as financial account information including account balances, transaction history, account owner information, and/or other information. Also, for example, enterprise network management infrastructure 120 may include various servers and/or databases that may manage information technology resources for the enterprise organization. For example, enterprise network management infrastructure 120 may include various servers and/or databases that may manage access controls to enterprise network devices. Additionally, or alternatively, enterprise network management infrastructure 120 may receive instructions from real-time application data validation computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data, including access controls to network devices and/or other resources hosted, executed, and/or otherwise provided by enterprise network management infrastructure 120. Also, for example, enterprise data storage platform 130 may be configured to store and/or otherwise maintain information associated with data transmissions between enterprise applications (e.g., first enterprise application 140, second enterprise application 150), and/or between an enterprise application and an external vendor application (e.g., first enterprise application 140 and external application 160). Additionally, or alternatively, enterprise network management infrastructure 120 may load data from enterprise data storage platform 130, manipulate and/or otherwise process such data, and return modified data and/or other data to enterprise data storage platform 130 and/or to other computer systems included in computing environment 100.

First enterprise application 140 and second enterprise application 150 may be applications utilized by the enterprise organization, and managed, hosted, executed, and/or otherwise provided by enterprise network management infrastructure 120. For example, first enterprise application 140 may be a financial application and second enterprise application 150 may be an accounting application. Also, for example, enterprise application 140 may be a travel reservation related application and second enterprise application 150 may be an expense management application. Also, for example, first enterprise application 140 may be a word processing application and second enterprise application 150 may be a telecommunications application. The term "enterprise application" as used herein, may generally refer to any application used within as enterprise organization. For example, an enterprise application may be a stand-alone application, or a suite of applications.

External application 160 may be an application provided by a vendor. For example, external application 160 may be a human resource application, a travel management application, a health insurance provider application, payment processing application, a voice over IP ("VOIP") service application, and so forth. The term "external application" as used herein, may generally refer to any application provided by an external vendor to an enterprise organization.

Enterprise applications and/or external applications may relate to billing and invoicing systems, payment processing systems, security investigation and mitigation systems, payroll systems, human resource systems, sales related platforms, production environment systems, product design and control systems, enterprise planning systems, enterprise resource management systems, web services hosting platforms, networks management tools, legal function management platforms, and so forth.

Computing environment 100 also may include one or more networks, which may interconnect one or more of real-time application data validation computing platform 110, enterprise network management infrastructure 120, enterprise data storage platform 130, first enterprise application 140, second enterprise application 150, and external application 160. For example, computing environment 100 may include private network 170 (which may interconnect, for example, real-time application data validation computing platform 110, enterprise network management infrastructure 120, and enterprise data storage platform 130, first enterprise application 140, second enterprise application 150, and/or one or more other systems (which may be associated with an organization, such as a financial institution), and public network 180 (which may interconnect, for example, external application 160 with private network 170 and/or one or more other systems, public networks, sub-networks, and/or the like). For example, public network 180 may interconnect external application 160 with first enterprise application 140 and/or second enterprise application 150 via private network 170. In some instances, public network 180 may be a high generation cellular network, such as, for example, a fifth generation ("5G") or higher cellular network. In some instances, private network 170 may likewise be a high generation cellular enterprise network, such as, for example, a 5G or higher cellular network.

In one or more arrangements, real-time application data validation computing platform 110, enterprise network management infrastructure 120, enterprise data storage platform 130, first enterprise application 140, second enterprise application 150, and external application 160, and/or the other systems included in computing environment 100 may be any type of computing device capable of communicating with a user interface, receiving input via the user interface, and communicating the received input to one or more other computing devices. For example, real-time application data validation computing platform 110, enterprise network management infrastructure 120, enterprise data storage platform 130, first enterprise application 140, second enterprise application 150, and external application 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of real-time application data validation computing platform 110, enterprise network management infrastructure 120, enterprise data storage platform 130, first enterprise application 140, second enterprise application 150, and external application 160, may, in some instances, be special-purpose computing devices configured to perform specific functions.

Referring to FIG. 1B, real-time application data validation computing platform 110 may include one or more processors 111, memory 112, and communication interface 113. A data bus may interconnect processor 111, memory 112, and communication interface 113. Communication interface 113 may be a network interface configured to support communication between real-time application data validation computing platform 110 and one or more networks (e.g., public network, private network, a local network, or the like). Memory 112 may include one or more program modules having instructions that when executed by processor 111 cause real-time application data validation computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of real-time application data validation computing platform 110 and/or by different computing devices that may form and/or otherwise make up real-time application data validation computing platform 110.

For example, memory 112 may have, store, and/or include application data collection engine 112a, data comparison engine 112b, anomaly detection engine 112c, and action triggering engine 112d. Application data collection engine 112a may have instructions that direct and/or cause real-time application data validation computing platform 110 to collect, in real-time and via a computing device and via a wireless network, information associated with a plurality of data transmissions between applications, where the information includes, for each data transmission of the plurality of data transmissions, an indication of a source application and a destination application, for each data transmission of the plurality of data transmissions, a first indication whether the data transmission was sent by the source application, and for each data transmission of the plurality of data transmissions, a second indication whether the data transmission was received by the destination application.

Data comparison engine 112b may have instructions that direct and/or cause real-time application data validation computing platform 110 to compare, via the computing device and in real-time and for each data transmission of the plurality of data transmissions, the first indication and the second indication. Anomaly detection engine 112c may have instructions that direct and/or cause real-time application data validation computing platform 110 to detect, via the computing device and based on the comparing and for a particular data transmission, a lack of a match between the first indication and the second indication, and identify, based on the detecting, the particular data transmission as an anomalous data transmission. Action triggering engine 112d may have instructions that direct and/or cause real-time application data validation computing platform 110 to trigger, via the computing device, one or more security actions to mitigate the anomalous data transmission.

Figure 2:
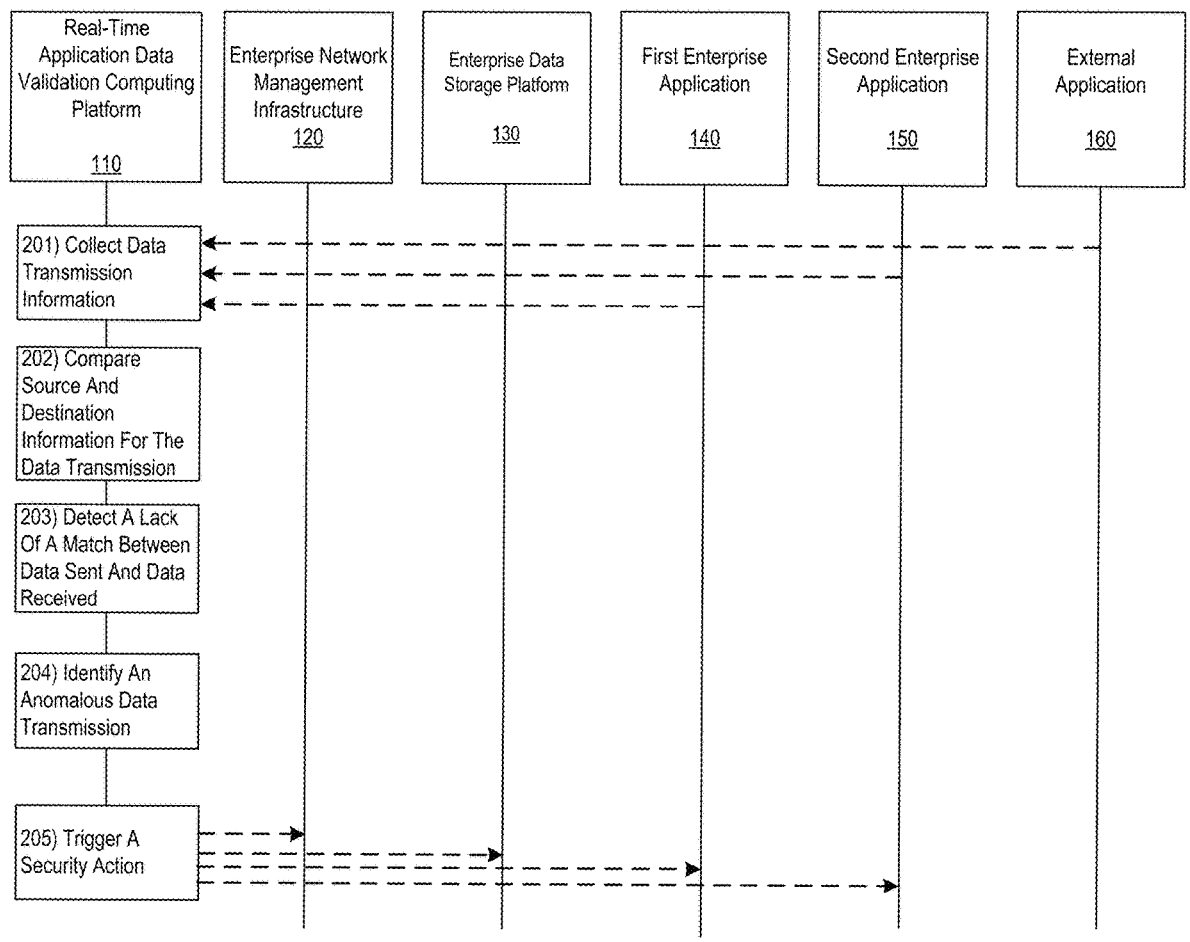
FIG. 2 depicts an illustrative event sequence for a real-time validation of application data in accordance with one or more example embodiments.

FIG. 2 depicts an illustrative event sequence for a real-time validation of application data in accordance with one or more example embodiments. Referring to FIG. 2, at step 201, real-time application data validation computing platform 110 may collect, in real-time and via a computing device and via a wireless network, information associated with a plurality of data transmissions between applications, where the information includes, for each data transmission of the plurality of data transmissions, an indication of a source application and a destination application, for each data transmission of the plurality of data transmissions, a first indication whether the data transmission was sent by the source application, and for each data transmission of the plurality of data transmissions, a second indication whether the data transmission was received by the destination application.

As described herein, enterprise network management infrastructure 120 may be configured to manage, host, execute, and/or otherwise provide one or more enterprise applications. Network devices within enterprise network management infrastructure 120 may generate large volumes of data transmissions, including machine-generated transmissions. For example, network devices, such as, various servers and/or databases, sensors, routers, computing devices, printers, scanners, building entry verification devices, cameras, and so forth, may generate vast amounts of data. Additional devices may include, for example, web resources, firewalls, and/or operating systems. Such data may include, for example, access data, log data, location data, data on software updates, diagnostic data, user and/or account data, and so forth.

Real-time application data validation computing platform 110 may collect data from a variety of sources, including, for example, via an application programming interface ("API"). In some embodiments, real-time application data validation computing platform 110 may monitor an enterprise device via a device access manager, and/or device driver. Also, for example, data may be collected from log files (server log files, database log files, application activity files), network management devices, network routers, and so forth. For example, data packets sent over a network may comprise headers that list source and/or destination network nodes for the data packet, a communication path for the data packet, and so forth.

Generally, applications (e.g., first enterprise application 140, second enterprise application 150, external application 160) may communicate with one another to exchange information via data transmissions. For example, each data transmission may originate at an application (e.g., source application) and a second application (e.g., destination application) may be an intended recipient. For example, a source application may initiate a data transmission to request information, and the destination application may receive this request. In response, the destination application may provide the requested information by initiating a data transmission to the requesting (e.g., source) application. Data transmissions may comprise exchange of data packets over a network. Content of the data transmission may include electronic communication messages, HTML documents, word processing documents, media content, audio and/or visual content, data packets associated with telecommunications, and so forth.

In some embodiments, the source application and the destination application may be associated with an enterprise organization. For example, the source application may be, for example, first enterprise application 140, and the destination application may be, for example, second enterprise application 150. In some embodiments, the source application may be associated with an enterprise organization, and the destination application may be associated with an external vendor organization. For example, the source application may be, for example, first enterprise application 140, and the destination application may be, for example, external application 160. In some embodiments, the destination application may be associated with an enterprise organization, and the source application may be associated with an external vendor organization. For example, the source application may be, for example, external application 160, and the destination application may be, for example, second enterprise application 150.

In some embodiments, real-time application data validation computing platform 110 may display, via a graphical user interface, the information in a tabular format, where the tabular format may list, for each application, a first sub-plurality of the plurality of data transmissions for which the application is a source application, and a second sub-plurality of the plurality of data transmissions for which the application is a destination application. For example, a table may be associated with each application, and the table may comprise a list of data transmissions sent and/or received by the application, including an identifier for each such data transmission.

Figure 3:
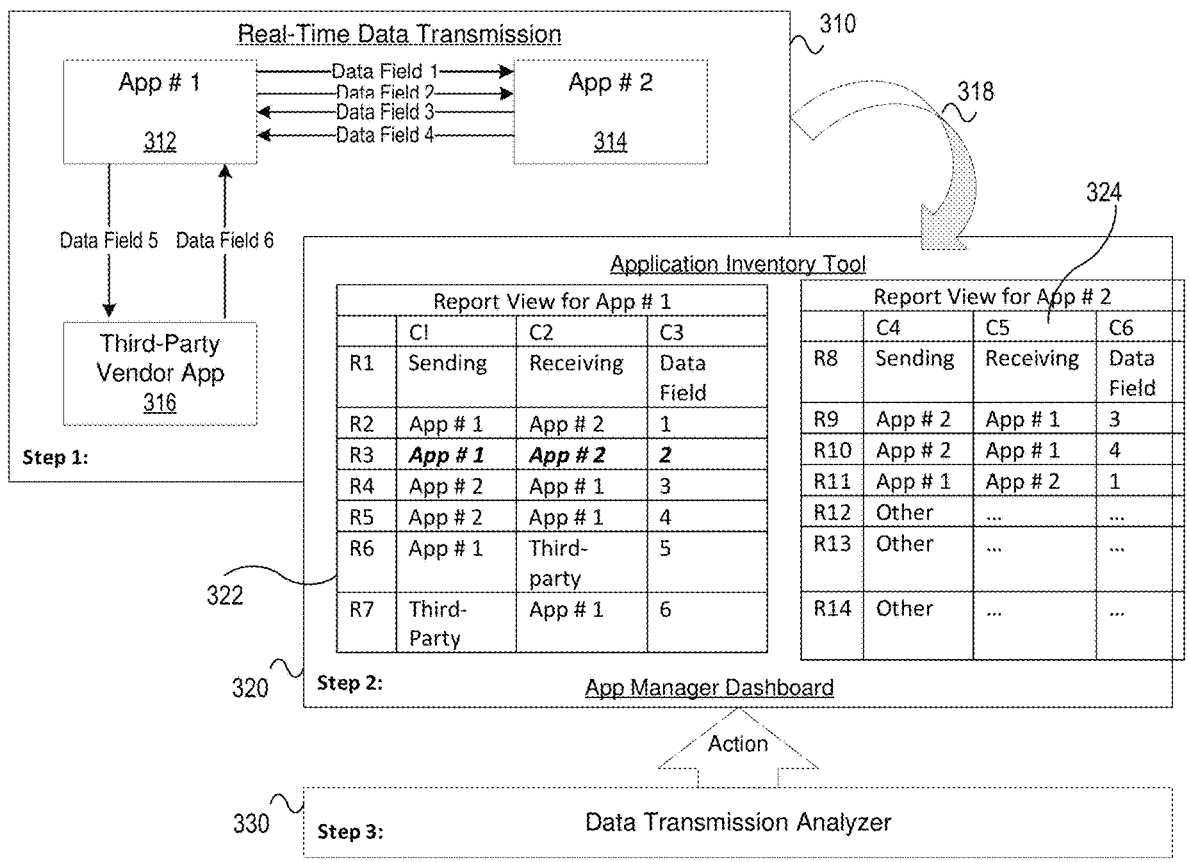
FIG. 3 depicts an illustrative method for a real-time validation of application data in accordance with one or more example embodiments.

FIG. 3 depicts an illustrative method for a real-time validation of application data in accordance with one or more example embodiments. At step 1, real-time data transmission 310 is depicted. App #1 312 may be, for example, first enterprise application 140; App #2 314 may be, for example, second enterprise application 150; and Third-party Vendor App 316 may be, for example, external application 160. As indicated, "Data Field 1" and "Data Field 2" are sent by App #1 312 with App #2 314 as the intended recipient. Also, for example, "Data Field 3" and "Data Field 4" are sent by App #2 314 with App #1 312 as the intended recipient. As another example, "Data Field 5" is sent by App #1 312 with Third-party vendor app 316 as the intended recipient; whereas "Data Field 6" is sent by Third-party vendor app 316 with App #1 312 as the intended recipient.

This information is collected and provided to the Application Inventory Tool 320 (as indicated by arrow 318), which, at step 2, displays the information via an App Manager Dashboard to an enterprise user, such as a security expert, who may optionally review the information from time to time. The App Manager Dashboard may be provided as a graphical user interface. For example, Report View for App #1 is displayed in first table 322. Column C1 of first table 322 lists the application that is sending a data transmission (e.g., the source application); column C2 of first table 322 lists the application that is receiving a data transmission (e.g., the destination application); and column C3 of first table 322 lists an identifier for a data transmission.

Accordingly, for "Data Field 1", column C1, row R2 lists "App #1" as the sending or source application, column C2, row R2 lists "App #2" as the destination application, while column C3, row R2 lists "1" as an identifier associated with "Data Field 1". Also, for example, column C1, row R3 lists "App #1" as the sending or source application, column C2, row R3 lists "App #2" as the destination application, while column C3, row R3 lists "2" as an identifier associated with "Data Field 2".

As another example, column C1, row R4 lists "App #2" as the sending or source application, column C2, row R4 lists "App #1" as the destination application, while column C3, row R4 lists "3" as an identifier associated with "Data Field 3". Also, for example, column C1, row R5 lists "App #2" as the sending or source application, column C2, row R5 lists "App #1" as the destination application, while column C3, row R5 lists "4" as an identifier associated with "Data Field 4".

As another example, column C1, row R6 lists "App #1" as the sending or source application, column C2, row R6 lists "Third-party" as the destination application, while column C3, row R6 lists "5" as an identifier associated with "Data Field 5". As another example, column C1, row R7 lists "Third-party" as the sending or source application, column C2, row R7 lists "App #1" as the destination application, while column C3, row R7 lists "6" as an identifier associated with "Data Field 6".

Also, for example, Report View for App #2 is displayed in second table 324. Column C4 of second table 324 lists the application that is sending a data transmission (e.g., the source application); column C5 of second table 324 lists the application that is receiving a data transmission (e.g., the destination application); and column C6 of second table 324 lists an identifier for a data transmission.

Accordingly, column C4, row R9 lists "App #2" as the sending or source application, column C5, row R9 lists "App #1" as the destination application, while column C6, row R9 lists "3" as an identifier associated with "Data Field 3". Also, for example, column C4, row R10 lists "App #2" as the sending or source application, column C5, row R10 lists "App #1" as the destination application, while column C6, row R10 lists "4" as an identifier associated with "Data Field 4". As another example, column C4, row R11 lists "App #1" as the sending or source application, column C5, row R11 lists "App #2" as the destination application, while column C6, row R11 lists "1" as an identifier associated with "Data Field 1".

In general, when a data transmission is sent from or received by a first application (e.g., first enterprise application 140), this information is recorded in first table 322 that displays a Report View for App #1. Likewise, when a data transmission is sent from or received by a second application (e.g., second enterprise application 150), this information is recorded in second table 324 that displays a Report View for App #2. Although first table 322 and second table 324 are depicted for illustrative purposes only, each application may be associated with a table that records information for incoming and outgoing data transmissions. As data flows occurs over the network of devices and applications, each of these tables is updated in real-time. Although six data fields are shown for illustrative purposes, generally there may be millions of data fields, and each table for each application may have thousands of entries.

In some embodiments, real-time application data validation computing platform 110 may update, dynamically and in real-time and via the computing device, the display. For example, as the information in the tables get updated, real-time application data validation computing platform 110 may update the displayed information as well. In some embodiments, real-time application data validation computing platform 110 may update, dynamically and in real-time and via the computing device, the information the tabular format, wherein the update comprises generating, for each data transmission of the plurality of data transmissions, a new row.

For example, if there is a first indication that "Data Field 7" is sent from App #1 312, with App #2 314 as the intended destination, then a new row may be added to first table 322. For example, a new row may be inserted after R7, where column C1 would comprise the information "App #1", column C2 would comprise the information "App #2", and column C3 would comprise the information "7" corresponding to "Data Field 7."

Similarly, if there is a second indication that "Data Field 7" is received by App #2 314 as the destination, then a new row may be added to second table 324. For example, a new row may be inserted after R14, where column C1 would comprise the information "App #1", column C2 would comprise the information "App #2", and column C3 would comprise the information "7" corresponding to "Data Field 7." However, if "Data Field 7" is not received by App #2 314, then no new row will be added to second table 324.

At step 202, real-time application data validation computing platform 110 may compare, via the computing device and in real-time and for each data transmission of the plurality of data transmissions, the first indication and the second indication. For example, referring again to FIG. 3, row R2 of first table 322 corresponds to row R11 of second table 324. As another example, row R4 and R5 of first table 322 correspond to rows R9 and R10, respectively, of second table 324. Accordingly, real-time application data validation computing platform 110 may compare rows from different tables to determine if there is a match between a first indication that a data transmission was sent and a second indication that a data transmission was received. For example, real-time application data validation computing platform 110 may identify a data transmission along with a source application (e.g., first application 140) and an intended destination application (e.g., second application 150). In some embodiments, real-time application data validation computing platform 110 may access enterprise data storage platform 130 to retrieve an updated first table associated with the source application (e.g., first table 322), and retrieve an updated second table associated with the intended destination application (e.g., second table 324) to determine if there is a corresponding row in the updated second table, that indicates that the destination application received the data transmission.

At step 203, real-time application data validation computing platform 110 may detect, via the computing device and based on the comparing and for a particular data transmission, a lack of a match between the first indication and the second indication. For example, real-time application data validation computing platform 110 may identify, from row R3 of first table 322 that "Data Field 2" was transmitted by App #1 312 with App #2 314 as the intended recipient. However, upon reviewing the rows in second table 324, real-time application data validation computing platform 110 may detect that there is no row in second table 324 that corresponds to or matches row R3 of first table 322. Accordingly, real-time application data validation computing platform 110 may detect that the particular data transmission of "Data Field 2" was not received by App #2 314. In some embodiments, analysis, including comparing and detection, may be performed by a data transmission analyzer 330 at step 3.

As may be appreciated, given a large number of applications and a volume of data transmission activity, it is not feasible for a human being to collect data related to such network activity. In particular, a computing device would be needed to retrieve network data. Also, for example, due to the real-time nature of the collection activity, a computing device would be needed to retrieve and collate such data. Moreover, in comparing contents of tables associated with the applications, a specialized computer may be needed to compare the collected data (e.g., compare rows in tables) in real-time. Also, as may be appreciated, content from pairs of tables associated with applications are simultaneously compared to detect if an anomalous data transmission has occurred. Accordingly, no number of mental steps may be able to process such tasks. Also, for example, detecting an anomalous data transmission is real-time may be of significant importance, so as to prevent and/or otherwise mitigate other data transmission.

At step 204, real-time application data validation computing platform 110 may identify, based on the detecting, the particular data transmission as an anomalous data transmission. In some embodiments, real-time application data validation computing platform 110 may highlight the information associated with the anomalous data transmission. For example, for illustrative purposes only, referring again to FIG. 3, the entries in row R3 of first table 322 are depicted in "Bold" and "Italics". Other methods may be utilized to highlight the information, such as, for example, different color schemes, graphics, animations, call-outs, and so forth.

Many large enterprises, such as, for example, financial institutions, may utilize various computing infrastructure to transact business with their customers. Such transactions may include secure enterprise information, such as confidential information, protected information, and/or other sensitive data that is created and/or used for various purposes. It may therefore a significant priority to protect the integrity and confidentiality of the underlying secure enterprise information and deter a breach of confidentiality, and/or data privacy. For example, as described, if two applications or a third-party vendor product are communicating with each other, then each of them may report data that is sent and/or received. Accordingly, when real-time application data validation computing platform 110 analyzes the reports from each application, it may find complementing information (data that was sent was also received by the intended recipient), or real-time application data validation computing platform 110 may detect a discrepancy. Accordingly, by detecting data transmissions, real-time application data validation computing platform 110 may identify data leaks where transmitted data is not received by the intended recipient, and/or incorrect data transmissions.

For example, referring again to FIG. 3, real-time application data validation computing platform 110 may identify, from row R3 of first table 322 that "Data Field 2" was transmitted by App #1 312 with App #2 314 as the intended recipient. However, upon reviewing the rows in a table associated with App #X, real-time application data validation computing platform 110 may detect that there is a row in the table that corresponds to or matches row R3 of first table 322. For example, the table associated with App #X may include a row with the "sending" column corresponding to an entry, "App #1", the "receiving" column corresponding to an entry, "App #X" and the "data field" column corresponding to an entry, "2". Accordingly, real-time application data validation computing platform 110 may analyze first table 322 to determine that no data transmission was sent from "App #1" with "App #X" as an intended recipient. This may be combined with a knowledge that there is no row in second table 324 that corresponds to or matches row R3 of first table 322. Accordingly, real-time application data validation computing platform 110 may infer that "Data Field 2" which was sent by "App #1", with an intended recipient "App #2", was misdirected to "App #X."

At step 205, real-time application data validation computing platform 110 may trigger, via the computing device, one or more security actions to mitigate the anomalous data transmission. Generally, upon detecting the anomalous data transmission, real-time application data validation computing platform 110 may take steps to further investigate the anomalous data transmission, and/or take steps to mitigate consequences of the anomalous data transmission. In some embodiments, the one or more security actions may include preventing related data transmissions. For example, real-time application data validation computing platform 110 may identify the source application of the anomalous data transmission, and may automatically prevent the source application from sending related data transmissions. For example, the anomalous data transmission may be part of a stream of data packets that are transmitted by the source application, and upon detecting the anomalous data transmission, real-time application data validation computing platform 110 may prevent future data packets from being transmitted (e.g., by first enterprise application 140). As another example, upon detecting the anomalous data transmission, real-time application data validation computing platform 110 may identify an intended and/or actual destination for the anomalous data transmission, and prevent the intended and/or actual destination from receiving future data transmissions (e.g., by second enterprise application 150). As another example, when the destination application is an external vendor application (e.g., external application 160), real-time application data validation computing platform 110 may, upon detecting the anomalous data transmission, intercept related data transmissions prior to these transmissions exiting the enterprise system to be delivered to an external vendor ((e.g., external application 160).

In some embodiments, the one or more security actions may include modifying, via the computing device, an access permission of an enterprise user associated with the user device. For example, upon detecting an anomalous data transmission, real-time application data validation computing platform 110 may modify one or more access permissions for an enterprise user. For example, real-time application data validation computing platform 110 may retrieve access permissions from enterprise data storage platform 130, modify them, store the modified access permissions on enterprise data storage platform 130, and/or send instructions to enterprise network management infrastructure 120 to modify the relevant access permissions. For example, real-time application data validation computing platform 110 may prevent the enterprise user from accessing an external website, may prevent the enterprise user from sending electronic mails (or not allow the enterprise user to attach documents), may change access permissions for the enterprise user to enterprise resources and applications, may suspend or otherwise downgrade the enterprise user's security clearance, may notify enterprise security personnel of unauthorized activity, and/or suspected security breach, provide an alert to the enterprise user, alert a chain of management superior to the enterprise user, and so forth.

In some embodiments, the one or more security actions may include generating, based on the detecting, a risk profile of an enterprise user associated with the anomalous data transmission, where the risk profile is indicative of a likelihood of the enterprise user to transmit secure enterprise information. For example, a risk profile may be associated with an enterprise user based on a number of times an anomalous data transmission associated with the enterprise user is detected. For example, an enterprise user may, while utilizing an enterprise application, send and/or receive data transmissions that may be identified as anomalous data transmissions. Accordingly, the enterprise user may be associated with such anomalous data transmissions. A frequency of such associations may be indicative of a potential data security breach. Accordingly, a risk profile may be generated for the enterprise user.

For example, each enterprise user may be associated with a numerical score indicative of a number of identified anomalous data transmissions associated with the enterprise user. In some embodiments, the risk profile may be based on a type of role for the enterprise user. For example, an enterprise user associated with access to highly confidential material may have a higher risk score associated with them. For example, if an anomalous data transmission is detected and is associated with an enterprise user with a lower security profile (e.g., a front desk reception personnel), a lower risk score may be associated with such activity. However, if an anomalous data transmission is detected and is associated with an enterprise user with a higher security profile (e.g., an executive with access to highly privileged information), a higher risk score may be associated with such activity. In some embodiments, real-time application data validation computing platform 110 may identify security profiles based on existing access permissions associated with business roles, and may automatically determine a type of multiplier to be applied to an enterprise user's risk score based on a business role of the enterprise user.

In some embodiments, the one or more security actions may include generating, based on the detecting, a risk profile of an application associated with the anomalous data transmission, where the risk profile is indicative of a likelihood of the application to transmit secure enterprise information. For example, a risk profile may be associated with an enterprise application based on a number of times an anomalous data transmission associated with the enterprise application is detected. For example, the enterprise application may send and/or receive an anomalous data transmission, and real-time application data validation computing platform 110 may associate the enterprise application with the anomalous data transmission based on such activity. A frequency of such associations may be indicative of a potential data security breach. Accordingly, a risk profile may be generated for the enterprise application.

For example, each enterprise application may be associated with a numerical score indicative of a number of identified anomalous data transmissions associated with the enterprise application. In some embodiments, the risk profile may be based on a type of enterprise application. For example, an enterprise application associated with security related information may have a higher risk score associated with it. For example, if an anomalous data transmission is detected and is associated with an enterprise application with a lower security related profile (e.g., web resource with safe browsing links), a lower risk score may be associated with the enterprise application. However, if an anomalous data transmission is detected and is associated with an enterprise application with a higher security profile (e.g., a human resource application, a security monitoring application, an unauthorized user activity monitoring application), a higher risk score may be associated with the enterprise application. In some embodiments, real-time application data validation computing platform 110 may identify security profiles based on existing security profiles associated with enterprise applications, and may automatically determine a type of multiplier to be applied to an enterprise application's risk score based on the security profile.

In some embodiments, the one or more security actions may include generating a notification for an application manager to review the anomalous data transmission. For example, real-time application data validation computing platform 110 may generate a notification to an application manager to determine if they intend to send and/or receive an identified anomalous data transmission. As another example, real-time application data validation computing platform 110 may generate a notification to a supervising manager responsible for an enterprise user associated with an anomalous data transmission. The supervising manager may then initiate one or more steps to further mitigate and/or prevent unauthorized activity by the enterprise user.

In some embodiments, the one or more security actions may include reviewing, via the computing device, a content of the anomalous data transmission. For example, upon detecting an anomalous data transmission, real-time application data validation computing platform 110 may retrieve an actual content of the data transmission for further analysis. For example, if the data transmission is a textual communication, real-time application data validation computing platform 110 may utilize text processing techniques to analyze the textual communication to determine and/or confirm unauthorized activity. Also, for example, if the data transmission is an audio communication, real-time application data validation computing platform 110 may utilize speech-to-text processing techniques and/or speech recognition techniques to analyze the audio communication to determine and/or confirm unauthorized activity. Additional, or alternate techniques may be utilized to further detect unauthorized activity associated with an anomalous data transmission.

Figure 4:
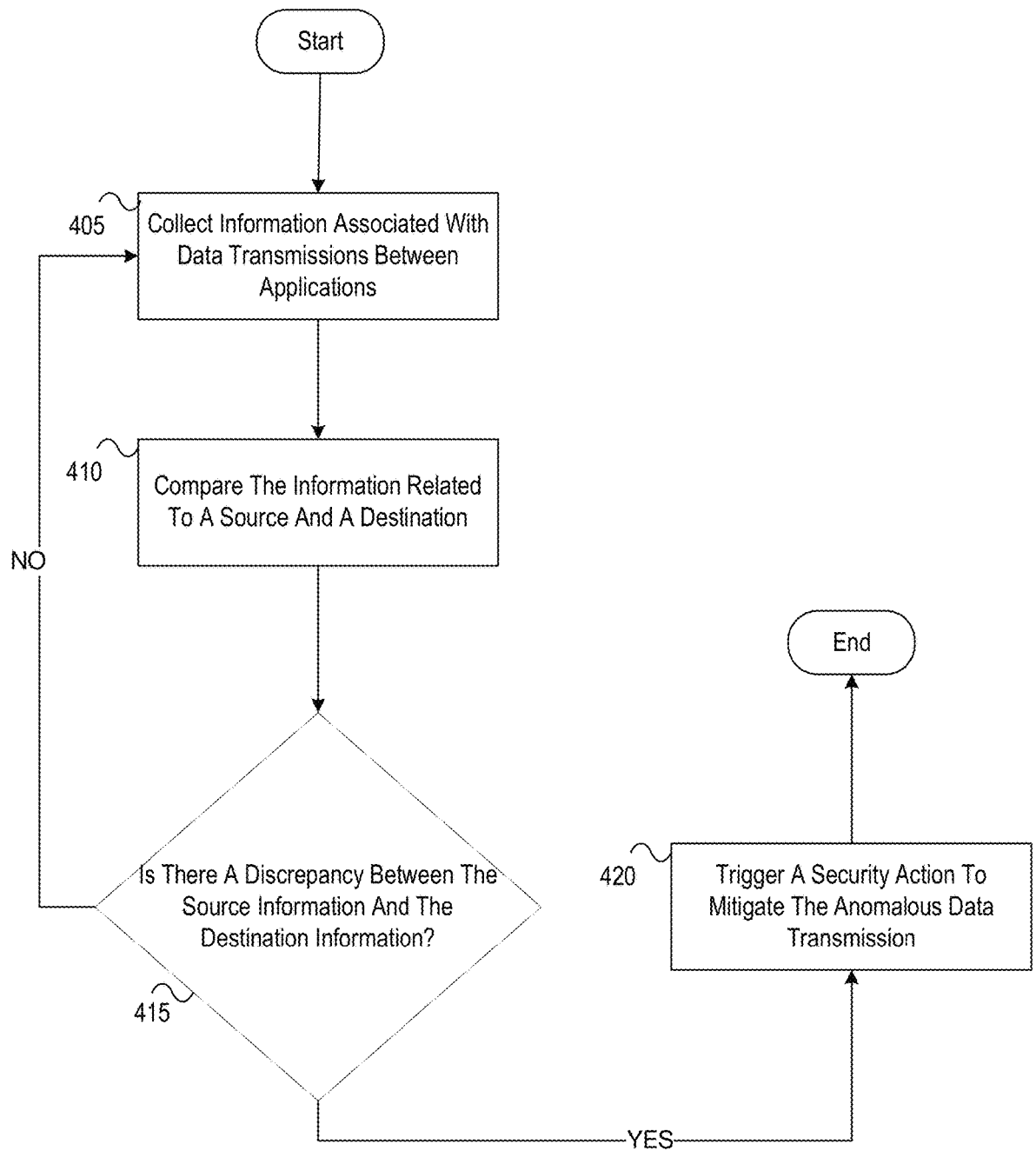
FIG. 4 depicts another illustrative method for a real-time validation of application data in accordance with one or more example embodiments.

FIG. 4 depicts another illustrative method for a real-time validation of application data in accordance with one or more example embodiments. Referring to FIG. 4, at step 405, a computing platform having at least one processor, a communication interface, and memory may collect, in real-time and via a computing device and via a wireless network, information associated with a plurality of data transmissions between applications, where the information includes, for each data transmission of the plurality of data transmissions, an indication of a source application and a destination application, for each data transmission of the plurality of data transmissions, a first indication whether the data transmission was sent by the source application, and for each data transmission of the plurality of data transmissions, a second indication whether the data transmission was received by the destination application. At step 410, the computing platform may compare, via the computing device and in real-time and for each data transmission of the plurality of data transmissions, the first indication whether the data transmission was sent by the source application, and the second indication whether the data transmission was received by the destination application.

At step 415, the computing platform may determine if there is a discrepancy between the first indication from the source application and the second indication from the destination application. If at step 415, the computing platform determines that there is a discrepancy between the first indication from the source application and the second indication from the destination application, the process may proceed to step 420. At step 420, the computing platform may trigger, via the computing device, one or more security actions to mitigate the anomalous data transmission. If at step 415, the computing platform determines that there is no discrepancy between the first indication from the source application and the second indication from the destination application, the process may return to step 405.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to implement one or more aspects of the disclosure more effectively, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
collect, in real-time and via a computing device and via a communication network, information associated with a plurality of data transmissions between applications, wherein the information comprises:
for each data transmission of the plurality of data transmissions, an indication of a source application and a destination application,
for each said data transmission of the plurality of data transmissions, a first indication whether the data transmission was sent by the source application, and
for each said data transmission of the plurality of data transmissions, a second indication whether the data transmission was received by the destination application;
compare, via the computing device and in real-time and for each said data transmission of the plurality of data transmissions, the first indication and the second indication;
detect, via the computing device and based on the comparing and for a particular data transmission, whether there is a mismatch between the first indication and the second indication; and
when no anomalous data transmission is detected, repeat the collecting and the comparing.

2. The computing platform of claim 1, wherein the instructions, when executed by the at least one processor, cause the computing platform to:
when anomalous data transmission is detected, identify, based on the detecting, the particular data transmission as an anomalous data transmission.

3. The computing platform of claim 2, wherein the instructions, when executed by the at least one processor, cause the computing platform to:
based on the identifying, trigger, via the computing device, one or more security actions to mitigate the anomalous data transmission.

4. The computing platform of claim 3, wherein the one or more security actions comprise preventing, via the computing device, related data transmissions.

5. The computing platform of claim 3, wherein the one or more security actions comprise modifying, via the computing device, an access permission of an enterprise user associated with the anomalous data transmission.

6. The computing platform of claim 3, wherein the one or more security actions comprise generating, based on the detecting, a risk profile of an enterprise user associated with the anomalous data transmission, wherein the risk profile is indicative of a likelihood of the enterprise user to transmit secure enterprise information.

7. The computing platform of claim 3, wherein the one or more security actions comprise generating, based on the detecting, a risk profile of an application associated with the anomalous data transmission, wherein the risk profile is indicative of a likelihood of the application to transmit secure enterprise information.

8. The computing platform of claim 3, wherein the one or more security actions comprise generating a notification for an application manager to review the anomalous data transmission.

9. The computing platform of claim 3, wherein the one or more security actions comprise reviewing, via the computing device, a content of the anomalous data transmission.

10. The computing platform of claim 1, wherein the instructions, when executed by the at least one processor, cause the computing platform to:
display, via a graphical user interface, the information in a tabular format, wherein the tabular format lists, for each application, a first sub-plurality of the plurality of data transmissions for which the application is a source application, and a second sub-plurality of the plurality of data transmissions for which the application is a destination application.

11. The computing platform of claim 10, wherein the instructions, when executed by the at least one processor, cause the computing platform to:
update, dynamically and in real-time and via the computing device, the graphical user interface.

12. The computing platform of claim 10, wherein the instructions, when executed by the at least one processor, cause the computing platform to:
highlight the information associated with the anomalous data transmission.

13. The computing platform of claim 10, wherein the instructions, when executed by the at least one processor, cause the computing platform to:
update, dynamically and in real-time and via the computing device, the information in the tabular format, wherein the update comprises generating, for each said data transmission of the plurality of data transmissions, a new row.

14. The computing platform of claim 1, wherein the source application and the destination application are associated with an enterprise organization.

15. The computing platform of claim 1, wherein the source application is associated with an enterprise organization, and the destination application is associated with an external vendor organization.

16. A method, comprising:
at a computing platform comprising at least one processor, a communication interface, and memory:
collecting, in real-time and via a computing device and via a communication network, information associated with a plurality of data transmissions between applications, wherein the information comprises:
for each data transmission of the plurality of data transmissions, an indication of a source application and a destination application,
for each said data transmission of the plurality of data transmissions, a first indication whether the data transmission was sent by the source application, and
for each said data transmission of the plurality of data transmissions, a second indication whether the data transmission was received by the destination application;
comparing, via the computing device and in real-time and for each said data transmission of the plurality of data transmissions, the first indication and the second indication;
detecting, via the computing device and based on the comparing and for a particular data transmission, a lack of a match between the first indication and the second indication; and
when no anomalous data transmission is detected, repeating the collecting and the comparing.

17. The method of claim 16, further comprising:
when anomalous data transmission is detected, identifying, based on the detecting, the particular data transmission as an anomalous data transmission.

18. The method of claim 17, further comprising:
based on the identifying, triggering, via the computing device, one or more security actions to mitigate the anomalous data transmission.

19. One or more non-transitory computer-readable media storing instructions that, when executed by a computing platform comprising at least one processor, a communication interface, and memory, cause the computing platform to:
collect, in real-time and via a computing device and via a communication network, information associated with a plurality of data transmissions between applications, wherein the information comprises:
for each data transmission of the plurality of data transmissions, an indication of a source application and a destination application,
for each said data transmission of the plurality of data transmissions, a first indication whether the data transmission was sent by the source application, and
for each said data transmission of the plurality of data transmissions, a second indication whether the data transmission was received by the destination application;
compare, via the computing device and in real-time and for each said data transmission of the plurality of data transmissions, the first indication and the second indication;
detect, via the computing device and based on the comparing and for a particular data transmission, a lack of a match between the first indication and the second indication; and
when no anomalous data transmission is detected, repeat the collecting and the comparing.

20. The one or more non-transitory computer-readable media of claim 19 storing instructions that, when executed by the computing platform, cause the computing platform to:
- when anomalous data transmission is detected, identify, based on the detecting, the particular data transmission as an anomalous data transmission; and
- based on the identifying, trigger, via the computing device, one or more security actions to mitigate the anomalous data transmission.

* * * * *